United States Patent Office 3,111,499
Patented Nov. 19, 1963

3,111,499
ZINC-OXIDE-SULFUR STABILIZER FOR
POLYOLEFIN COMPOSITIONS
Claus Heuck, Hofheim, Taunus, Ernst Stärk, Wuppertal-
Barmen, and Werner Doppler, Frankfurt am Main,
Germany, assignors to Farbwerke Hoechst Aktienge-
sellschaft vormals Meister Lucius & Brüning, Frankfurt
am Main, Germany, a corporation of Germany
No Drawing. Filed Feb. 5, 1958, Ser. No. 713,316
Claims priority, application Germany Feb. 9, 1957
8 Claims. (Cl. 260—41)

The present invention relates to a process for improving polymerization products of unsaturated hydrocarbons containing a double bond, preferably of ethylene and propylene.

The object of U.S. patent application S.N. 590,808, filed on June 12, 1956, in the name of Claus Heuck and Ernst Stärk for "Stabilized Polyolefins," is a method of improving polymerization products of olefins, preferably ethylene and propylene, wherein these polymers are treated with an element of group VI of the periodic table, which is capable of exerting positive and negative valencies, or with a compound of an element of group VI capable of liberating such element in a manner known.

It has already been proposed to polymerize at low temperatures and under low pressures olefins of low molecular weight with the aid of alumino-organic compounds which, if necessary, contain halogen, and compounds of a heavy metal or metals, of subgroups IV, V, VI, VII and VIII of the periodic table, for example titanium tetrachloride. These processes are designated as low-pressure polymerization processes and the polymers obtained as low-pressure polyolefins. They are, for example, described in Belgian Patents Nos. 533,362, 534,792 and 534,888, and are called Ziegler processes (cf. also Raff-Allison: "Polyethylene," 1956, p. 72 et seq.).

When using the process mentioned above, there is obtained a substantial stabilization of the cited polymerization products of ethylene and propylene, and the danger of the material becoming brittle after prolonged storage, especially when being exposed to high tempeuratures, is considerably reduced or almost eliminated.

Now we have found that low pressure polyolefins can be stabilized by adding to the polyolefin prior to the subsequent treatment zinc oxide in an amount ranging from 0.1–5% calculated upon the polymer, and an element of group VI of the periodic table. It is immaterial in which order of succession the said substances are added to the polymer. The zinc oxide is capable of removing hydrogen sulfide or hydrogen selenide present in said mixture.

The amount of said element of group VI of the periodic table, capable of having positive and negative valencies, which is added to the polyolefin should be from 0.1–5%, calculated upon the polyolefin.

It is also possible, in the process of the invention, to use as additives known vulcanization accelerators.

If necessary, the zinc oxide may contain still other zinc compounds. Thanks to the process of the invention, the disagreeable odor peculiar in some cases to the products which have only been treated with sulphur or selenium is largely avoided.

When carrying out the after-treatment according to the process of the invention, there may also be admixed with the zinc oxide, for example, zinc stearate, zinc sulfide, colloidal silicic acid, aluminum oxide or carbon black in an amount ranging from 0.1 to 5%, calculated on the polymer. These additives improve the efficacy of the process according to the invention.

When using the polymerization products which are generally available in a pulverulent form and the likewise pulverulent additives, the production of the mixtures according to the process of the invention may take place in known manner in a suitable mixing device. In special cases the admixture of the aforementioned improving agents may also be performed on a roll mill, on a calender or by means of a suitable screw type extrusion machine in the course of which operation the material has to be thoroughly mixed. Also these processes are known to those skilled in the art.

It has proved to be particularly advantageous to prepare a premixture of the material in a pulverulent form and to after-treat the mixture on a roll mill or by extrusion at elevated temperatures. When the operation is carried out at elevated temperatures ranging from 150–250° C., the polymerization products are transformed into the plastic state so that an optimum homogeneity of the mixture is attained.

When operating according to this method, there is achieved a substantial removal of the hydrogen sulfide compounds occurring in certain, although small amounts only in the course of the reaction of the sulphur or selenium with the polymerization product concerned. In this manner we largely avoid the problem where the workers employed with performing this operation are molested by the odor occurring in the course of the subsequent molding process by compression, injection or extrusion techniques. The polymerization products obtained when using this method undergo no substantial change of color or, when taking into account the addition of, for example, zinc oxide, only exhibit the proper color of the product concerned. No difficulties are encountered when coloring the products thus obtained, especially when using suitable known organic coloring material.

The shaped articles obtained from these improved polymerization products exhibit an excellent resistance to aging surpassing by far that of shaped articles obtained from polymerization products which have not been after-treated.

The following examples serve to illustrate the invention, but they are not intended to limit it thereto:

*Example 1*

A homogeneous premixture of 1,500 grams of pulverulent polyethylene, obtained by the low-pressure process (Ziegler process) in a suitable known mixing mill, with 1.5 grams of colloid sulphur (0.1%) and
7.5 grams of zinc oxide (0.5%)

is thoroughly plasticized and mixed on a roll mill at 170° C. milling temperature (test 3 of the table given below). The milling time amounts to a total of two hours. After a milling time of 10 minutes, 60 minutes and 120 minutes respectively, there are taken samples which are tested as to their decomposition grade by determining the η spec. value, and as to their aging value by determining the brittle point. Test 4 is conducted on parallel lines: the same mixture containing, moreover, 0.1% of mercaptobenzothiazole as an activator in the improving process, is treated under the same test conditions. For purposes of comparison with tests 3 and 4 which had been carried out first there is, in addition to these two mixtures, tested a polyethylene sample containing only 0.1% of sulphur (test 2) and a polyethylene sample containing no additive whatever (test 1).

The result of the tests is shown in the following table:

|  | After a milling time on a mill roll at 170° C. | | | |
| --- | --- | --- | --- | --- |
|  | 0' | 10' | 60' | 120' |
| (1) polyethylene (no additive): | | | | |
| η spec. | 7.1 | 4.2 | 2.4 | insoluble. |
| Brittle point (days) | | 21 | 12 | 6 |
| (2) polyethylene+0.1% S: | | | | |
| η spec. | 7.1 | 6.0 | 4.9 | 3.8 |
| Brittle point | | + | + | + |
| (3) polyethylene+0.1% S+0.5% ZnO: | | | | |
| η spec. | 7.1 | 7.1 | 6.9 | 5.1 |
| Brittle point (days) | | 28 | + | + |
| (4) polyethylene+0.1% S+0.5% ZnO+0.1% mercapto-benzo-thiazole: | | | | |
| η spec. | 7.1 | 6.2 | 5.6 | 5.3 |
| Brittle point | | + | + | + |

The values laid down in the above table clearly demonstrate the effect achieved.

The decomposition grade is clearly shown by the decrease in the η spec. values. The improvement in the brittle behavior may be seen from the number of days after which the test specimens became brittle after having been subjected to a permanent storage in the heat at 110° C. The test specimens designated with + did not become brittle under these test conditions after a storage for 6 weeks.

*Example 2*

A pulverulent mixture of 1.5 kilos of low-pressure polypropylene is plasticized with 2 grams of colloid sulphur
10 grams of zinc oxide and
1.5 grams of dinaphthyl phenylene diamine on a roll mill at 250° C. until an homogeneous mixture is obtained. The mixing time amounts to about 10–12 minutes.

The increase in the resistance to becoming brittle of the polymerization product after-treated according to this method is eight to ten times as high as that of the untreated material; it, consequently, has a substantially lower decomposition grade.

We claim:

1. A process of stabilizing a low pressure polyolefin against ageing and embrittlement, said low pressure polyolefin being prepared by polymerizing an olefin selected from the group consisting of ethylene and propylene in the presence of a catalytic amount of a catalyst prepared by mixing an organo-metallic compound with a compound of a metal of subgroups IV–VIII of the periodic table, said process comprising incorporating into said polyolefin prior to the preparation of a shaped article therefrom 0.5–0.67% by weight, based on the weight of the polymer, of zinc oxide and 0.1–0.133% by weight of a member selected from the group consisting of sulfur, selenium, and tellurium.

2. The process of claim 1 wherein as filling material a further additive selected from the group consisting of zinc stearate, zinc sulfide, colloidal silicic acid, aluminum oxide, and carbon black in an amount of 0.1–5% by weight based on the weight of polyolefin is added to the latter.

3. Process of claim 2 wherein said further additive is carbon black.

4. A process for stabilizing low pressure polyethylene against embrittlement and ageing, said polyethylene being prepared by polymerizing ethylene in the presence of a catalytic amount of a catalyst prepared by mixing an organo-metallic compound with a compound of a metal of subgroups IV–VIII of the periodic table, which comprises homogeneously mixing said polyethylene in pulverized form with 0.5–0.67% by weight of zinc oxide and 0.1–0.133% by weight of sulfur; and after-treating the mixture on a roll mill at a temperature ranging from 150–250° C.

5. A process for stabilizing low pressure polypropylene against embrittlement and ageing, said polypropylene being prepared by polymerizing propylene in the presence of a catalytic amount of a catalyst prepared by mixing an organo-metallic compound with a compound of a metal of subgroups IV–VIII of the periodic table, which comprises homogeneously mixing said polypropylene in pulverized form with 0.5–0.67% by weight of zinc oxide, 0.1–0.133% sulfur, and dinaphthyl phenylene diamine; and after-treating the mixture on a roll mill at a temperature ranging from 150–250° C.

6. A new composition of matter consisting essentially of (1) a stabilized low pressure polyolefin, said polyolefin being prepared by polymerizing a member selected from the group consisting of ethylene and propylene in the presence of a catalytic amount of a catalyst prepared by mixing an organo-metallic compound with a compound of a metal of subgroups IV–VIII of the periodic table, and (2) 0.5–0.67% by weight, based on the weight of the polyolefin, of zinc oxide and 0.1–0.133% by weight of a member selected from the group consisting of sulfur, selenium, and tellurium.

7. A new composition of matter consisting essentially of a stabilized low pressure polyolefin, said polyolefin being prepared by polymerizing a member selected from the group consisting of ethylene and propylene in the presence of a catalytic amount of a catalyst prepared by mixing an organo-metallic compound with a compound of a metal of subgroups IV–VIII of the periodic table, and 0.5–0.67% by weight based on the weight of the polyolefin of zinc oxide, 0.1–0.133% by weight of a member selected from the group consisting of sulfur, selenium, and tellurium, and as filling material a further additive selected from the group consisting of zinc stearate, zinc sulfide, colloidal silicic acid, aluminum oxide, and carbon black.

8. Composition of claim 7 wherein said further additive is carbon black.

References Cited in the file of this patent

UNITED STATES PATENTS

| | | |
| --- | --- | --- |
| 2,105,363 | Nowak | Jan. 11, 1938 |
| 2,561,063 | McBurney et al. | July 17, 1951 |
| 2,582,510 | Stiratelli | Jan. 15, 1952 |
| 2,599,123 | Pinkey et al. | June 3, 1952 |
| 2,727,879 | Vincent | Dec. 20, 1955 |
| 2,731,453 | Field et al. | Jan. 17, 1956 |
| 2,791,705 | Vieweg | May 7, 1957 |
| 2,850,490 | Canterino et al. | Sept. 2, 1958 |
| 2,874,140 | Kloepfer | Feb. 17, 1959 |
| 2,890,187 | Bowman et al. | June 9, 1959 |
| 2,953,542 | Stark et al. | Sept. 20, 1960 |

FOREIGN PATENTS

| | | |
| --- | --- | --- |
| 591,058 | Great Britain | Aug. 6, 1947 |